(12) United States Patent
Kwak et al.

(10) Patent No.: US 8,554,152 B2
(45) Date of Patent: Oct. 8, 2013

(54) APPARATUS AND METHOD FOR ESTIMATING CHANNEL IN MOBILE COMMUNICATION SYSTEM

(75) Inventors: Hyo-Chul Kwak, Suwon-si (KR); Myung-Kwang Byun, Suwon-si (KR); Yu-Suk Yun, Seoul (KR); Sung-Kwon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 12/976,054

(22) Filed: Dec. 22, 2010

(65) Prior Publication Data
US 2011/0151802 A1 Jun. 23, 2011

(30) Foreign Application Priority Data
Dec. 23, 2009 (KR) .......................... 10-2009-0130232

(51) Int. Cl.
*H04B 17/00* (2006.01)
(52) U.S. Cl.
USPC ............ 455/67.13; 455/67.11; 455/63.1; 375/227; 375/224
(58) Field of Classification Search
USPC ............ 455/67.13, 67.11, 63.1, 226.1, 226.3; 375/227, 224, 340, 346
See application file for complete search history.

(56) References Cited

U.S. PATENT DOCUMENTS

| 6,433,333 | B1 * | 8/2002 | Howard | 250/252.1 |
|---|---|---|---|---|
| 7,158,770 | B2 * | 1/2007 | Hanaoka et al. | 455/226.1 |
| 7,447,490 | B2 * | 11/2008 | Kuo et al. | 455/250.1 |
| 7,599,426 | B2 * | 10/2009 | Despain | 375/152 |
| 7,756,196 | B1 * | 7/2010 | Despain et al. | 375/152 |
| 7,768,252 | B2 * | 8/2010 | Park et al. | 324/76.19 |
| 8,121,221 | B2 * | 2/2012 | Kuo et al. | 375/316 |
| 8,234,549 | B2 * | 7/2012 | Djordjevic et al. | 714/780 |
| 2005/0117548 | A1 * | 6/2005 | Cam | 370/335 |
| 2006/0209721 | A1 * | 9/2006 | Mese et al. | 370/254 |
| 2006/0264192 | A1 * | 11/2006 | Kuo et al. | 455/232.1 |
| 2012/0122415 | A1 * | 5/2012 | Saitoh | 455/296 |
| 2012/0163207 | A1 * | 6/2012 | Dua et al. | 370/252 |
| 2012/0270582 | A1 * | 10/2012 | Mese et al. | 455/501 |
| 2013/0093525 | A1 * | 4/2013 | Le Phan et al. | 331/35 |

* cited by examiner

*Primary Examiner* — Minh D Dao
(74) *Attorney, Agent, or Firm* — Jefferson IP Law, LLP

(57) ABSTRACT

An apparatus and a method for estimating a channel in a mobile communication system are provided. The apparatus includes a channel estimation unit for determining a channel estimation value using a channel power for each of a plurality of fingers, and a noise estimation unit for selecting a scheme for estimating a thermal noise power according to a channel environment among schemes for determining a plurality of thermal noise powers, and for estimating a noise using the channel estimation value in the selected scheme.

15 Claims, 4 Drawing Sheets

APPARATUS AND METHOD FOR ESTIMATING CHANNEL IN MOBILE COMMUNICATION SYSTEM

PRIORITY

This application claims the benefit under 35 U.S.C. §119 (a) of a Korean patent application filed in the Korean Industrial Property Office on Dec. 23, 2009, and assigned Serial No. 10-2009-0130232, the entire disclosure of which is hereby incorporated by reference.

BACKGROUND OF THE INVENTION

1. Field of the Invention

The present invention relates to a mobile communication system. More particularly, the present invention relates to an apparatus and a method for estimating a channel in a wireless communication system.

2. Description of the Related Art

When determining the capability of a mobile communication system, it is very important that noise power is estimated accurately. Therefore, research and various studies have been performed for estimating a channel with accuracy and for increasing the accuracy by estimating the noise power in various schemes.

FIG. 1 is a diagram illustrating a configuration of a receiver in a mobile communication system according to the related art.

Referring to FIG. 1, the receiver includes a wireless communication unit 101, a conversion unit 103, a first de-spreader unit 105, a second de-spreader unit 107, a third de-spreader unit 109, a channel estimation unit 111 and a compensation unit 113.

First, the wireless communication unit 101 performs a down conversion by mixing an input signal received from an RF antenna with a carrier wave frequency, and then transmits the signal to the conversion unit 103. The conversion unit 103 converts the analog signal received from the wireless communication unit 101 into a digital signal, and adjusts a power of the converted digital signal to fall within an operation range of a modem. The adjusted signal is transmitted to plural fingers corresponding to delays of respective multiple paths.

As shown in FIG. 1, the fingers comprise the first to third de-spreader units 105 to 109, respectively.

The first de-spreader unit 105 restores a pilot symbol, the second de-spreader unit 107 estimates a noise power, and the third de-spreader unit 109 restores a data symbol. Each of the first to third de-spreader units 105 to 109 carries out the despreading on the received signal using an orthogonal code for each channel which is used in transmission.

In general, a Spreading Factor (SF) of data is less than that of the code carrying a pilot signal. If the SF of the pilot signal is 256 chips and the SF of the data is 4, the data is applied with the same channel compensation during 64 symbol intervals.

On the other hand, the estimation of the noise power can be performed by measuring in units of a constant time interval according to an implementation scheme. In the conventional technique, since the second de-spreader unit 107 employs a de-spreading scheme in which the de-spreading is performed using an Orthogonal Variables Spreading Factor (OVSF), after the de-spreading, the original signal component does not remain but thermal noise and interference caused by multiple paths remain. In order to obtain the noise power, each In-phase/Quadrature (I/Q) is squared and added together. The noise power estimation value as described above is used for the channel compensation as well as for reporting the Signal to Noise Ratio (SNR) to a Digital Signal Processor (DSP). Therefore, the accuracy for estimating the noise power is a factor that affects the modem performance.

However, the noise power estimation value estimated using a typical channel estimation apparatus includes the other path interference power caused by the multiple paths as well as the thermal noise components. Therefore, since the affect of the other path interference increases as the signal power is increased, the value is not suitable for the noise power estimation value. For example, in a modem system using an equalizer, if the noise power is estimated using unused OVSF as the conventional scheme, the performance of the receiver may be degraded.

Therefore, a need exists for an improved apparatus and method for estimating a channel accurately by extracting a noise power.

SUMMARY OF THE INVENTION

An aspect of the present invention is to address at least the above-mentioned problems and/or disadvantages and to provide at least the advantages described below. Accordingly, an aspect of the present invention is to provide an apparatus and method for estimating a channel accurately by extracting a noise power.

Another aspect of the present invention is to improve the performance of a receiver even when the equalizer scheme is used as well as when the conventional finger combining scheme is used.

In accordance with an aspect of the present invention, an apparatus for estimating a channel in a mobile communication system is provided. The apparatus includes a channel estimation unit for determining a channel estimation value using a channel power for each of a plurality of fingers, and a noise estimation unit for selecting a scheme for estimating a thermal noise power according to a channel environment, and for estimating a noise using the channel estimation value in the selected scheme.

In accordance with another aspect of the present invention, a method for estimating a channel in a mobile communication system is provided. The method includes estimating a channel using a channel power for each of a plurality of fingers, selecting a scheme for estimating a thermal noise power according to a channel environment among schemes for determining a plurality of thermal noise powers, and estimating a noise using the channel estimation value in the selected scheme.

In accordance with yet another aspect of the present invention, a method for estimating a channel in a mobile communication system is provided. The method includes summing up unused Orthogonal Variables Spreading Factor (OVSF) powers for respective ones of a plurality of fingers, and estimating a thermal noise power by eliminating the original signal component from the summed unused OVSF power for respective ones of the plurality of fingers.

In accordance with still another aspect of the present invention, a method for estimating a channel in a mobile communication system is provided. The method includes estimating a channel using channel powers for respective ones of a plurality of fingers and summing up the powers, calculating power of a reception signal, and estimating a thermal noise power by eliminating the summed channel power for respective ones of the plurality of fingers from the calculated power of the reception signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, for estimating noise power, interference between channels is reduced by the multipath so as to increase the accuracy of the estimated value. For this purpose, a channel power estimation value for each finger in the time axis, an unused Orthogonal Variables Spreading Factor (OVSF) power, and a Received Signal Strength Indication (RSSI) value are used for the noise power estimation.

Figure 1:
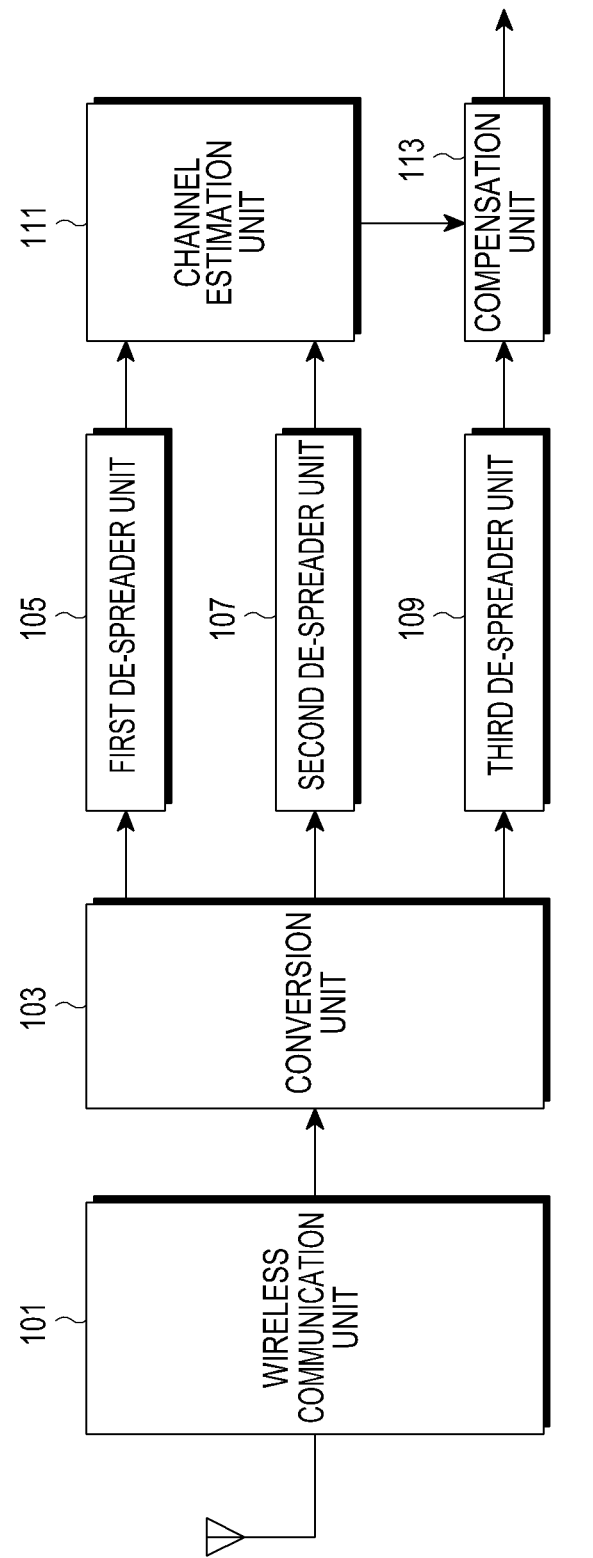
FIG. 1 is a diagram illustrating a configuration of a receiver for estimating a channel of a mobile communication system according to the related art.
Figure 2:
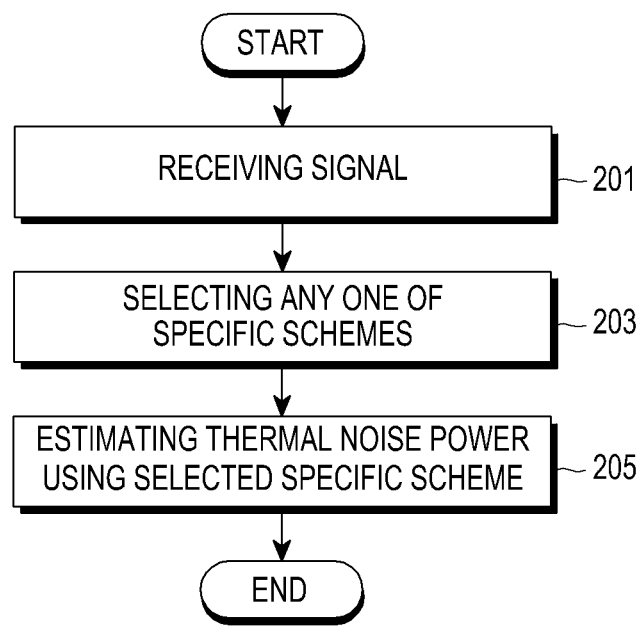
FIG. 2 is a diagram illustrating a procedure of estimating a channel in a receiver according to an exemplary embodiment of the present invention.

FIG. 2 is a diagram illustrating a procedure of estimating a channel in a receiver according to an exemplary embodiment of the present invention.

Referring to FIG. 2, the receiver receives an input signal through a wireless communication unit in step 201. In step 203, the receiver selects a noise estimation scheme, and, in step 205, estimates a thermal noise power using the selected noise estimation scheme. For example, in step 203, the receiver may select a noise estimation scheme that has the highest performance regarding final reception.

Figure 3:
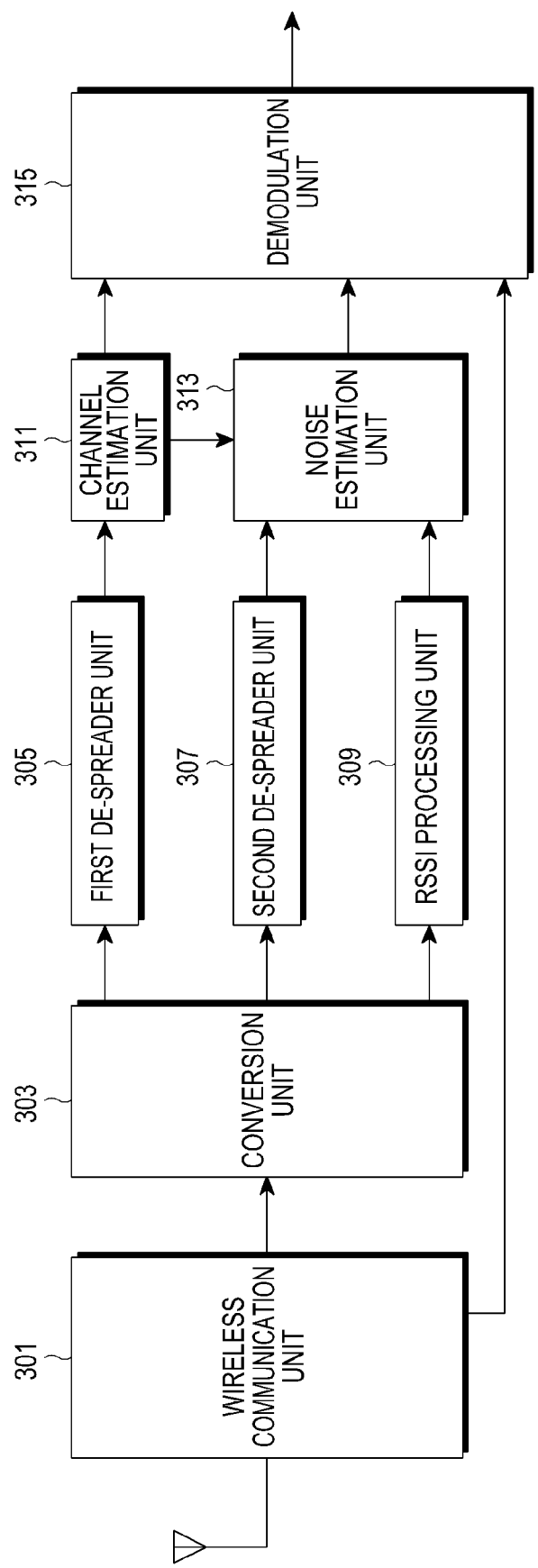
FIG. 3 is a diagram illustrating a configuration of a receiver for estimating a channel in a mobile communication system according an exemplary embodiment of to the present invention.

FIG. 3 is a diagram illustrating a configuration of a receiver for estimating a channel in a mobile communication system according to an exemplary embodiment of the present invention.

Referring to FIG. 3, the receiver includes a wireless communication unit 301, a conversion unit 303, a first de-spreader unit 305, a second de-spreader unit 307, an RSSI processing unit 309, a channel estimation unit 311, a noise estimation unit 313 and a demodulation unit 315. Herein, the first de-spreader unit 305 restores a pilot symbol for estimating a channel state. Further, the second de-spreader unit 307 is used for estimating a thermal noise accurately in the noise estimation unit 313 as well as estimating a noise for each finger.

The wireless communication unit 301 receives an analog signal received by an antenna.

The conversion unit 303 converts the analog signal received through the wireless communication unit 301 into a digital signal, and adjusts the power of the converted signal to fall within an operation range of a modem.

The first de-spreader unit 305 carries out despreading on a code on which the pilot or auxiliary pilot signal is carried.

The second de-spreader unit 307 carries out despreading on the code carrying the pilot signal or the auxiliary pilot signal using an unused OVSF so as to estimate the noise and interference power for each finger.

The RSSI processing unit 309 calculates an RSSI value which is the power of the received signal. Herein, the RSSI value includes the power of the sending signal through a multipath channel and the thermal noise power together.

The channel estimation unit 311 estimates the channel power for each finger using the pilot signal output from the first de-spreader unit 305.

The noise estimation unit 313 may estimate the thermal noise power using any of the channel power for each finger output from the channel estimation unit 311, the unused OVSF power output from the second de-spreader unit 307, and the RSSI value output from the RSSI processing unit 309. Herein, the thermal noise power for each antenna can be used regardless whether an equalizer is performed in the time axis or the frequency axis.

The demodulation unit 315 is configured to include an equalizer (not shown), and receives the channel power estimated in the channel estimation unit 311 and the thermal noise power estimated in the noise estimation unit 313. Further, the demodulation unit 315 performs equalization in order to consider a reception signal, which is input through the multipath according to a channel environment, as one path.

As described above, the noise estimation unit 313 estimates the noise using the RSSI, which is the power of the reception signal, and the channel power, which is estimated for each finger by the channel estimator as well as the unused OVSF power. Hereinafter, the above three noise estimation schemes, that is, the scheme for using the channel power for each finger, the scheme for using the unused OVSF power, and the scheme for using the RSSI will be described in more detail.

The first scheme for using the channel power for each finger is a scheme in which the thermal noise power and the power generated by the other path interference are included.

For example, the first scheme selects a minimum value among the noise power estimation values depending on the finger and uses the minimum value as a representative value. Such a scheme is suitable for the case where there is little interference of the other path such as the Additive White Gaussian Noise (AWGN) channel.

The second scheme for using the unused OVSF power is a scheme in which the noise components and the channel components of the other fingers except for the corresponding finger are included. In other words, the unused OVSF power of each finger can be represented as Equation 1 below.

$$P^1_{unusedOVSF} = \sum_{\substack{i=2 \\ i \neq 1}}^{L} |h_i|^2 + N_0 \qquad \text{[Equation 1]}$$

$$P^2_{unusedOVSF} = \sum_{\substack{i=1 \\ i \neq 2}}^{L} |h_i|^2 + N_0$$

$$\ldots$$

$$P^L_{unusedOVSF} = \sum_{\substack{i=1 \\ i \neq L}}^{L} |h_i|^2 + N_0$$

Therefore, to sum up all the unused OVSF powers, it can be represented as Equation 2 below.

$$P^{Total}_{unusedOVSF} = (L-1)\sum_{i=1}^{L} |h_i|^2 + LN_0 \qquad \text{[Equation 2]}$$

In Equation 2, $N_0$ denotes the thermal noise power, L denotes the total number of fingers, and $$\sum_{i=1}^{L} |h_i|^2$$

denotes the channel power for each finger.

Therefore, the thermal noise power can be represented as Equation 3 below.

$$N_0 = P^{Total}_{unusedOVSF} - (L-1)RSSI \qquad \text{[Equation 3]}$$

$$= (L-1)\sum_{i=1}^{L} |h_i|^2 + LN_0 - (L-1)\left(\sum_{i=1}^{L} |h_i|^2 + N_0\right)$$

$$= LN_0 - (L-1)N_0$$

$$= N_0$$

The third scheme for using the RSSI is a scheme in which the channel power estimation value of each multipath is excluded from the RSSI. The RSSI is the power of the reception signal, which includes the thermal noise component and the power component of the multipath channel. Herein, the RSSI can be represented as Equation 4 below.

$$RSSI = \sum_{i=1}^{L} |h_i|^2 + N_0 \qquad \text{[Equation 4]}$$

In Equation 4, $N_0$ denotes the thermal noise power, L denotes the total number of fingers, and $$\sum_{i=1}^{L} |h_i|^2$$

denotes the channel power for each finger.

As can be seen in Equation 4, when the influence of the other path interference is eliminated, only the noise power component is extracted. The influence can be eliminated using the channel power for each finger which is estimated on the basis of the time axis by the channel estimation unit 311. The channel power can be measured by summing up the estimation power values of all channel paths corresponding to a section applied with the noise power and then summing up the channel powers of all corresponding fingers. Therefore, when the channel power is subtracted from the RSSI, only the thermal noise power is left, so that the influence of the interference caused by the multipath can be eliminated. This can be represented as Equation 5 below.

$$N_0 = RSSI - \sum_{i=1}^{L} |h_i|^2 \qquad \text{[Equation 5]}$$

The scheme for using the unused OVSF power and the scheme for using the RSSI are suitable for the case where the transmission power is high in the multipath channel environment.

Figure 4:
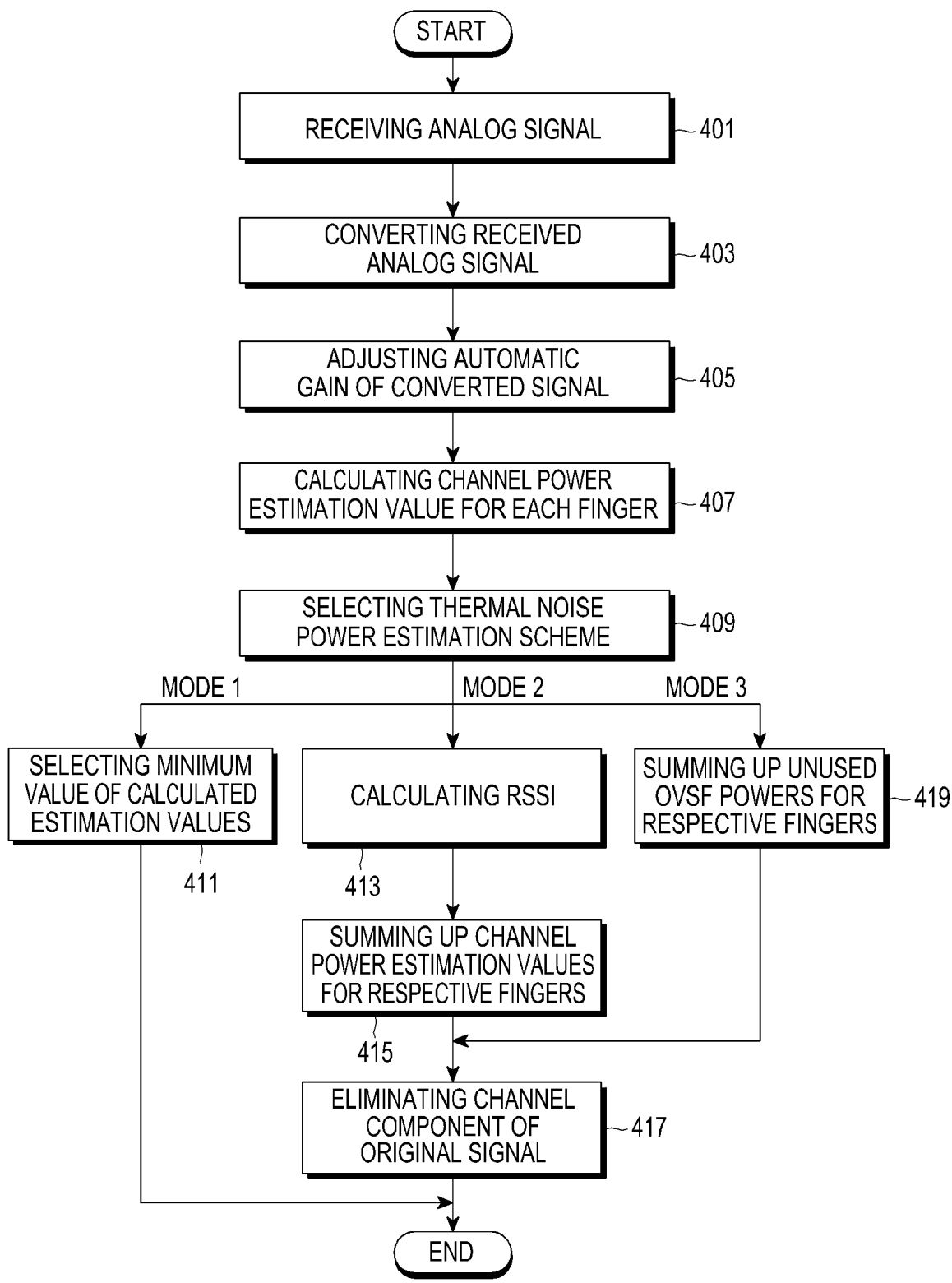
FIG. 4 is a diagram illustrating a procedure of estimating a channel according to an exemplary embodiment of the present invention.

FIG. 4 is a diagram illustrating a procedure for estimating a channel according to an exemplary embodiment of the present invention.

Referring to FIG. 4, a wireless communication unit receives an analog signal in step 401. In step 403, a conversion unit converts the analog signal into a digital signal, and adjusts an automatic gain of the digitalized signal in step 405. That is, the signal power is adjusted to fall within the operation range of the modem. In step 407, a channel estimation unit calculates the channel power estimation value for each finger. In step 409, a controller selects one of Mode 1 (e.g., the noise power estimation scheme for using the channel power for each finger), Mode 2 (e.g., the noise power estimation scheme for using the RSSI), and Mode 3 (e.g., the noise power estimation scheme for using the unused OVSF power) as the noise power estimation scheme. For example, the controller determines the degree of the other path interference and a channel environment based on the transmission power in the multipath channel environment, and selects the noise power estimation scheme through which the determined channel environment is optimized.

Since there is little interference of the other path due to the AWGN channel environment, if Mode 1 is selected, a noise estimation unit selects a minimum value of the calculated channel power estimation values for respective fingers as the noise power estimation value of the corresponding antenna in step 411.

On the other hand, if Mode 2 is selected, an RSSI processing unit calculates the RSSI in step 413, and sums up all the channel power estimation values for respective fingers, which are output from the channel estimation unit, in step 415. In step 417, the noise estimation unit eliminates the summation value of the channel power estimation values for respective fingers, which is output from the channel estimation unit, from the RSSI value calculated by a second de-spreader unit. That is, the channel component of the original signal is eliminated.

If Mode 3 is selected, the second de-spreader unit sums up the unused OVSF powers for respective fingers in step 419. In step 417, the noise estimation unit eliminates the channel component of the original signal from the summation value of the unused OVSF powers for respective fingers. Herein, assuming that the total number of fingers is L, it means that the channel component of the original signal corresponds to (L−1) times RSSI.

Table 1 shows the degradation in performance when Mode 2 is applied among the noise estimation schemes proposed above against the ideal noise estimation scheme. In order to achieve the same performance from the point of view of the data rate, Ec/No in the ideal noise estimation scheme and Ec/No in Mode 2 applied are measured and the difference therebetween is shown. The simulation takes the fixed point design into consideration.

TABLE 1

| Throughput | Degradation |
|---|---|
| 5000 kbps | 0.14 dB |
| 6000 kbps | 0.29 dB |
| 7000 kbps | 0.27 dB |

As shown above, it is possible to maintain the performance in a 0.14 dB range against the ideal noise estimation scheme in order to obtain a throughput of 5000 kbps. In addition, it is possible to maintain the performance in ranges of 0.29 dB and 0.27 dB against the ideal noise estimation scheme in order to obtain respective throughputs of 6000 kbps and 7000 kbps.

Therefore, compared with the case when the ideal noise estimation scheme is applied, the extent of degradation in performance can be limited to 0.3 dB in the noise estimation scheme proposed by exemplary embodiments of the present invention. Therefore, the accuracy in noise estimation is assured according to the design of the modem.

As described above, according to exemplary embodiments of the present invention, the channel can be estimated accurately by extracting only the noise power. Further, the performance of the receiver can be improved by using, for example, the equalizer scheme as well as the existing finger combining scheme.

The above description has been made with reference to a Code Division Multiple Access (CDMA) system. However, it should be understood that the present invention can be applied to other systems such as a High-Speed Packet Access+ (HSPA+) system. In this case, when the present invention is applied to the HSPA+ system, the pilot signal and the auxiliary pilot signal correspond to a Dedicated Physical Control Channel (DPCCH) and an Enhanced Dedicated Physical Control Channel (E-DPCCH), respectively.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for estimating a channel in a mobile communication system, the apparatus comprising:
    a channel estimation unit for determining a channel estimation value using a channel power for each of a plurality of fingers; and
    a noise estimation unit for selecting a scheme for estimating a thermal noise power according to a channel environment among schemes for determining a plurality of thermal noise powers, and for estimating a noise using the channel estimation value in the selected scheme.

2. The apparatus of claim 1, wherein the noise estimation unit selects a first scheme that estimates the thermal noise power as a minimum value of the noise powers for respective fingers.

3. The apparatus of claim 1, wherein the noise estimation unit selects a second scheme that estimates the thermal noise power using the following equation:

$$N_0 = P_{unused\ OVSF}^{Total} - (L-1)RSSI$$

where, $N_0$ denotes a thermal noise power, and L denotes the total number of fingers.

4. The apparatus of claim 1, wherein the noise estimation unit selects a third scheme that estimates the thermal noise power using the following equation:

$$N_0 = RSSI - \sum_{i=1}^{L} |h_i|^2$$

where, $N_0$ and L denote a thermal noise power and the total number of fingers, respectively, and $$\sum_{i=1}^{L} |h_i|^2$$

denotes a power for each finger.

5. The apparatus of claim 1, wherein the channel environment is determined on the basis of a degree of other path interference and a transmission power in a multipath channel environment.

6. A method for estimating a channel in a mobile communication system, the method comprising:
    estimating a channel using a channel power for each of a plurality of fingers;
    selecting a scheme for estimating a thermal noise power according to a channel environment among schemes for determining a plurality of thermal noise powers; and
    estimating a noise using the channel estimation value in the selected scheme.

7. The method of claim 6, wherein the selecting of the scheme for estimating the thermal noise power comprises selecting at least one of a scheme for estimating a noise power using the channel power for each of the plurality of fingers, a scheme for estimating a noise power using an unused Orthogonal Variables Spreading Factor (OVSF) power for each of the plurality of fingers, and a scheme for estimating a noise power using a Received Signal Strength Indication (RSSI) value.

8. The method of claim 6, wherein the selecting of the scheme comprises selecting a scheme in which a noise power with a minimum value of the noise powers for the plurality of fingers is used.

9. The method of claim 6, wherein the selecting of the scheme comprises selecting a scheme that estimates the thermal noise power using the following equation:

$$N_0 = P_{unused\ OVSF}^{Total} - (L-1)RSSI$$

where, $N_0$ is a thermal noise power, and L is the total number of fingers.

10. The method of claim 6, wherein the selecting of the scheme comprises selecting a scheme that estimates the thermal noise power using the following equation:

$$N_0 = RSSI - \sum_{i=1}^{L} |h_i|^2$$

where, $N_0$ and L denote a thermal noise power and the total number of fingers, respectively, and $$\sum_{i=1}^{L} |h_i|^2$$

denotes a power for each finger.

11. The method of claim 6, further comprising determining the channel environment on the basis of a degree of other path interference and a transmission power in a multipath channel environment.

12. A method for estimating a channel in a mobile communication system, the method comprising:

summing up unused Orthogonal Variables Spreading Factor (OVSF) powers for respective ones of a plurality of fingers; and estimating a thermal noise power by eliminating the original signal component from the summed unused OVSF power for respective ones of the plurality of fingers.

13. The method of claim 12, wherein the estimating of the thermal noise power comprises using the following equation:

$$N_0 = P_{unused\ OVSF}^{Total} - (L-1)RSSI$$

where, $N_0$ denotes a thermal noise power, and L denotes the total number of fingers.

14. A method for estimating a channel in a mobile communication system, the method comprising:

estimating a channel using channel powers for respective ones of a plurality of fingers and summing up the powers;

calculating power of a reception signal; and estimating a thermal noise power by eliminating the summed channel power for respective ones of the plurality of fingers from the calculated power of the reception signal.

15. The method of claim 14, wherein the estimating of the thermal noise power comprises using the following equation:

$$N_0 = RSSI - \sum_{i=1}^{L} |h_i|^2$$

where, $N_0$ and L denote a thermal noise power and the total number of fingers, respectively, and $$\sum_{i=1}^{L} |h_i|^2$$

denotes a power for each finger.

* * * * *